US006495386B2

(12) United States Patent
Powell

(10) Patent No.: US 6,495,386 B2
(45) Date of Patent: Dec. 17, 2002

(54) METHOD OF MANUFACTURING AN ACTIVE MATRIX DEVICE

(75) Inventor: Martin J. Powell, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/738,920

(22) Filed: Dec. 14, 2000

(65) Prior Publication Data

US 2001/0005598 A1 Jun. 28, 2001

(30) Foreign Application Priority Data

Dec. 15, 1999 (GB) ............................................. 9929615

(51) Int. Cl.$^7$ .......................... H01L 21/00; H01L 29/04
(52) U.S. Cl. .......................... 438/48; 438/30; 438/160; 438/161; 438/158; 257/57; 257/59; 257/72; 257/71
(58) Field of Search .......................... 438/48, 161, 158, 438/159, 164, 30, 160, 154; 257/57, 59, 72, 71

(56) References Cited

U.S. PATENT DOCUMENTS

| 4,918,504 | A | * | 4/1990 | Kato et al. | ...................... 257/59 |
| 5,130,829 | A | * | 7/1992 | Shannon | ....................... 359/59 |
| 5,198,377 | A | * | 3/1993 | Kato et al. | ................... 438/161 |
| 5,614,729 | A | * | 3/1997 | Ukai et al. | ...................... 257/57 |
| 6,323,068 | B1 | * | 11/2001 | Sen | ............................. 438/154 |
| 6,383,926 | B2 | * | 5/2002 | Powell | ....................... 438/678 |

FOREIGN PATENT DOCUMENTS

| JP | A60133758 | 7/1985 |
| JP | A60159825 | 8/1985 |
| JP | A04136917 | 5/1992 |

OTHER PUBLICATIONS

Sunata, T et al., A 640×400 pixel active–matrix LCD using a –si TFTs., Trans. On Electron Devices (Aug. 1986), vol.ED–33, No. 8. p. 1218–21.*

* cited by examiner

*Primary Examiner*—Caridad Everhart
*Assistant Examiner*—B. V. Keshavan
(74) *Attorney, Agent, or Firm*—Aaron Waxler

(57) ABSTRACT

A method of manufacturing an active matrix device (10) comprising a row and column array of active elements wherein each element comprises a transparent pixel electrode (12) associated with a self-aligned, top gate transistor (14, R2) having a transparent gate electrode (26). The method comprising the steps of forming opaque source (22) and drain (22') electrodes on a transparent substrate (51); forming a semiconductor channel layer (23) so as to join source (22) and drain (22') electrodes; forming a gate insulating (24, 25) layer; and depositing a transparent conductive layer and forming both the transparent gate electrode (26) and the pixel electrode (32) therefrom. The transparent gate electrode (26) may be formed by depositing a layer of negative resist (52) over the transparent conductive layer, exposing the layer of negative resist through the substrate such that regions of the negative resist shadowed by the opaque electrodes (22, 22') remain unexposed, removing the unexposed negative and, having masked the region (53) associated with the transparent pixel electrode (32), removing the exposed transparent conductive layer.

4 Claims, 7 Drawing Sheets

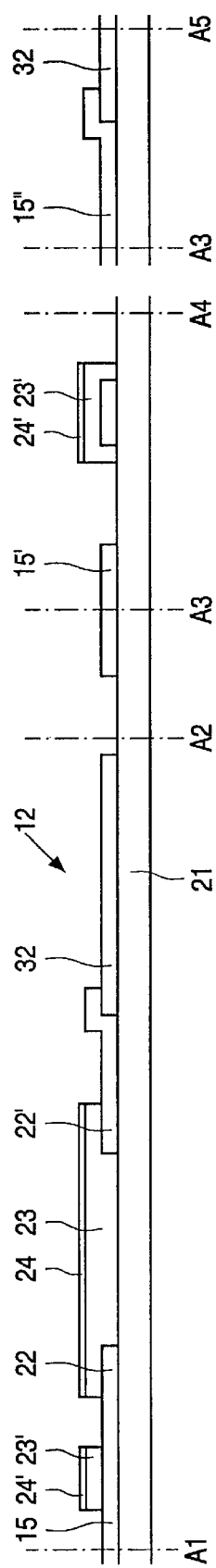 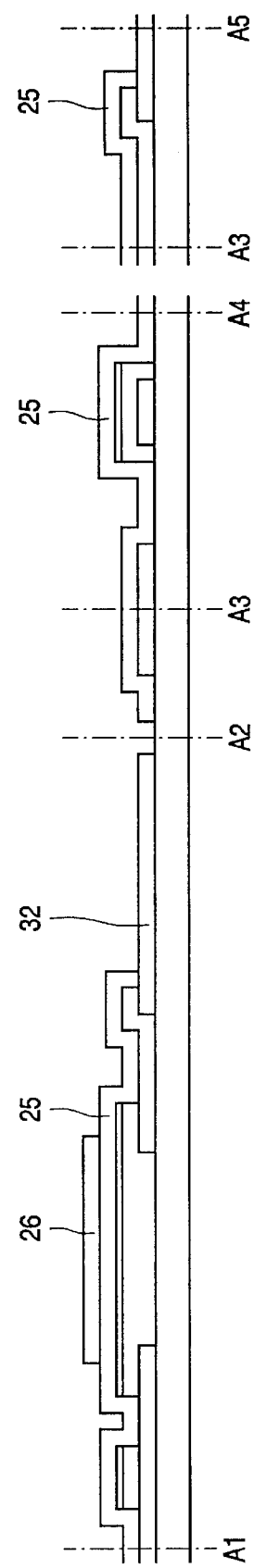 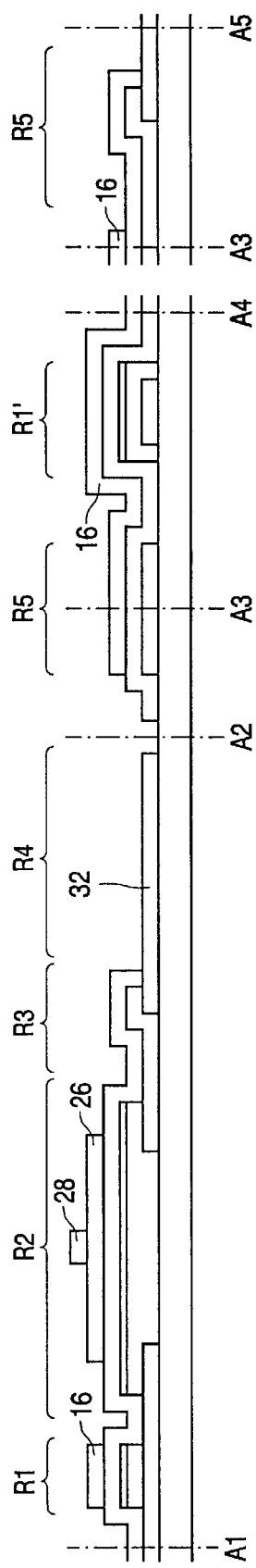

METHOD OF MANUFACTURING AN ACTIVE MATRIX DEVICE

This invention relates to a method of manufacture of an active matrix device, especially an active matrix liquid crystal display (AMLCD), wherein the device comprises a row and column array of active elements, and wherein each element is associated with a self-aligned, top gate (TG) thin film transistor (TFT) connected to corresponding row and column conductors.

A conventional AMLCD is shown schematically in FIG. 1. The AMLCD 10 comprises an display area 11 consisting of m rows (1 to m) and n columns (1 to n) of identical picture elements 12. Only a few of the picture elements are shown for simplicity whereas in practice, the total number of picture elements (m×n) in the display area may be 200,000 or more. Each picture element 12 has a picture electrode 13 and associated therewith a switching TFT 14 which serves to control the application of data signal voltages to the picture electrode. The switching TFTs have common operational characteristics and are each arranged adjacent to their associated picture element with their respective drain being connected to the picture electrode. The sources of all switching TFTs associated with one column of picture elements are connected to a respective one of a set of parallel column conductors 15 and the gates of all switching TFTs associated with one row of picture elements are connected to a respective one of a set of parallel row conductors 16. The TFTs 13 are controlled by gating signals provided via the row conductors by row driver circuitry 17 external to the display area 11. Similarly, the TFTs associated with picture elements in the same column are provided with data signal voltages for the picture electrodes by column driver circuitry 18 also external to the display panel. Of course, the operation of picture elements in such AMLCDs is well known and further described in our U.S. Pat. No. 5,130,829, and accordingly will not be elaborated upon here further.

During the manufacture of such an AMLCD, it is desirable to keep the capacitance of the switching TFTs to a minimum and one way of achieving this is to use self-aligned TFTs as the switching TFTs. Furthermore, using self-aligned TFTs does not require any increase in the mask count to achieve said reduction in capacitance.

FIGS. 2A to 2D show schematically a known process for producing a self-aligned TFT 14 requiring 4 photomask steps and a single back exposure. The process comprises the steps of forming opaque source 22 and drain electrodes 22' on a transparent substrate 21 (mask 1); forming an amorphous silicon semiconductor channel 23 so as to join the source and drain electrodes, and a first gate insulating layer 24 thereon (mask 2); forming a second gate insulating layer 25 (mask 3); depositing a layer of transparent gate material, typically indium tin oxide (ITO), and patterning the material by back exposure so as to form the gate electrode 26; and forming a gate contact 28 (mask 4). The transparent gate material may be patterned by providing a negative resist layer (not shown) over the material and selectively exposing it to UV radiation from beneath the substrate 21. The source and drain electrodes 22, 22' shield the UV light, so that the passage of light through the transistor structure only takes place in the spacing between the source and drain electrodes. The UV light diffracts and scatters as it passes through this opening, and results in source/drain overlap 27 wherein the exposed region of the resist layer is wider than the spacing between the source and drain electrodes. Source/drain overlap is useful in that the gate electrode may then modulate the whole of the semiconductor channel area. The overlap may be alternatively provided, inter alia, by overexposing the photoresist.

In order to realise the benefits of using self-aligned TFTs, the method of manufacturing the self-aligned TFTs must be incorporated into the whole picture element manufacturing process.

FIG. 3 shows, schematically, a conventional picture element 12 comprising a self aligned TFT of the type whose the manufacture is illustrated in FIGS. 2A to 2D. The picture element comprises 6 regions: a conductor crossover (R1, R1'); the self-aligned TG TFT (R2); a first transparent pixel electrode contact (R3); a transparent pixel electrode (R4); a capacitor (R5); and a second transparent pixel electrode contact (R6).

In addition, a known 6 photomask single back exposure method of manufacturing the picture element 12 of FIG. 3 is illustrated in FIGS. 4A to 4C wherein FIGS. 4A to 4C are cross sections of the picture element of FIG. 3 along lines A1-A2-A3-A4 and A3-A5.

Referring to FIG. 4A, the method comprises the steps of forming a transparent pixel electrode 32, typically ITO, on a transparent substrate 21 (mask 1); forming opaque source 22 and drain electrodes 22', and column conductors 15, part of which act a capacitor plate 15' and a pixel electrode contact 15" (mask 2); and forming a semiconductor channel layer 23 so as to join the source and drain electrodes, and a first gate insulating layer 24 thereon. Referring to FIG. 4B, a second gate insulating layer 25 is formed (mask 4) and a layer of transparent gate material deposited, typically ITO, and patterned by a back exposure so as to form the gate electrode 26 (back exposure plus mask 5). Mask 5 is required so as not to etch away the pixel electrode 32 whilst patterning the gate electrode 26. Lastly, as shown in FIG. 4C, a gate contact 28 and gate row conductors 16 are formed (mask 6).

It is an object of the invention to provide a simplified method of manufacturing an active matrix device, especially an AMLCD, using self-aligned TFT switching as described above.

In accordance with the present invention, there is provided a method of manufacturing an active matrix device comprising a row and column array of active elements wherein each element comprises a transparent pixel electrode associated with a self-aligned, top gate transistor having a transparent gate electrode, and an active matrix device manufactured using the same. The method comprises the steps of:

forming opaque source and drain electrodes on a transparent substrate;

forming a semiconductor channel layer so as to join source and drain electrodes;

forming an insulating layer, at least part of which comprises the gate dielectric; and depositing a transparent conductive layer over the insulating layer and forming both the transparent gate electrode and the transparent pixel electrode therefrom.

The present invention provides a manufacturing process for active matrix devices with a reduced mask count compared to known methods. This is, at least in part, attributable to the manufacture of the transparent gate electrode and the transparent pixel electrode from the same deposited layer.

Conveniently, the transparent gate electrode is formed by depositing a layer of negative resist over the transparent conductive layer, exposing the layer of negative resist through the substrate such that regions of the negative resist shadowed by the opaque electrodes remain unexposed, removing the unexposed negative and, having masked the region associated with the transparent pixel electrode, removing the exposed transparent conductive layer.

The pixel electrode may be formed over the insulating layer so as to reducing the amount of etching of the insulating layer required and in which case, the insulting layer may include etched contact holes so as to enable the drain electrode to be connected to the transparent pixel electrode.

Further provided in accordance with the present invention is an active matrix device comprising a row and column array of active elements wherein each element comprises opaque source and drain electrodes on a transparent substrate; a semiconductor channel layer joining the source and drain electrodes; an insulating layer, at least part of which comprises a gate dielectric; and transparent pixel and gate electrodes, both of which positioned over the insulating layer.

Embodiments of the present invention will now be described, by way of example only, with reference to the following drawings in which:

FIGS. 4A to 4C illustrate, schematically, a conventional 6 photomask, single back exposure method of manufacturing the picture element of FIG. 3, as hereinbefore described;

It should be noted that the drawings are schematic and relative dimensions and proportions of parts of the cross-section views and circuit layout have been exaggerated or reduced in size for the sake of clarity. The same reference signs are generally used to refer to corresponding or similar features in different embodiments.

Figure 1:
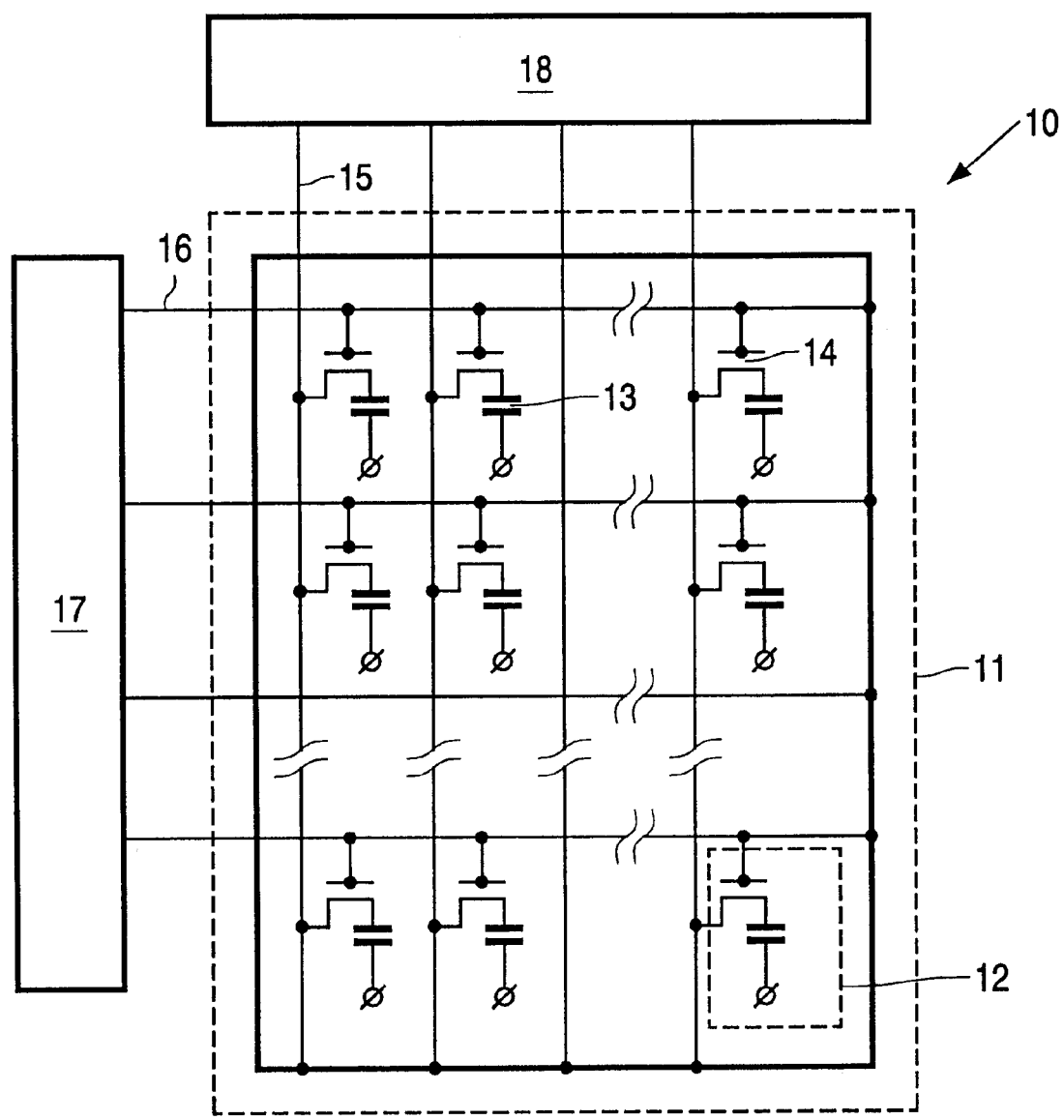
FIG. 1 shows, schematically, a conventional AMLCD as hereinbefore described.
Figure 2A:
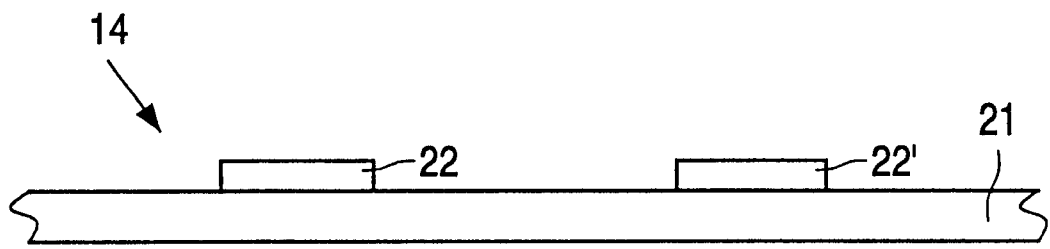
FIG. 2 illustrates, schematically, a conventional 4 photomask, single back exposure method of manufacturing a self-aligned TFT, as hereinbefore described.
Figure 2B:
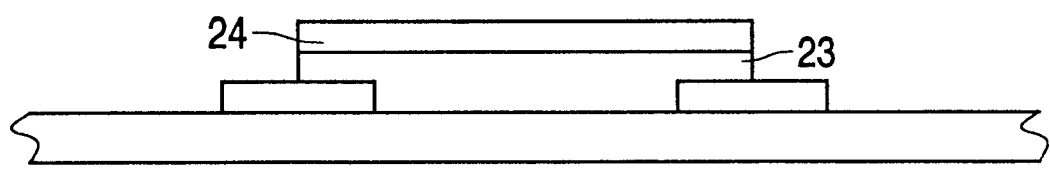
Figure 2C:
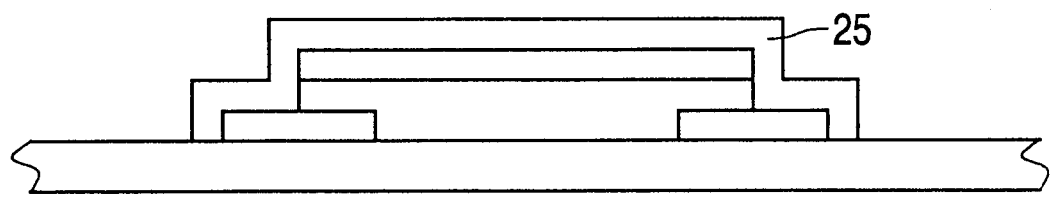
Figure 2D:
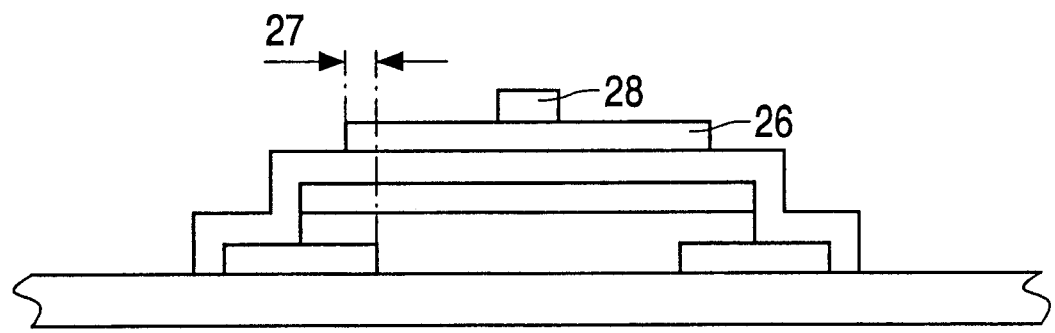
Figure 5:
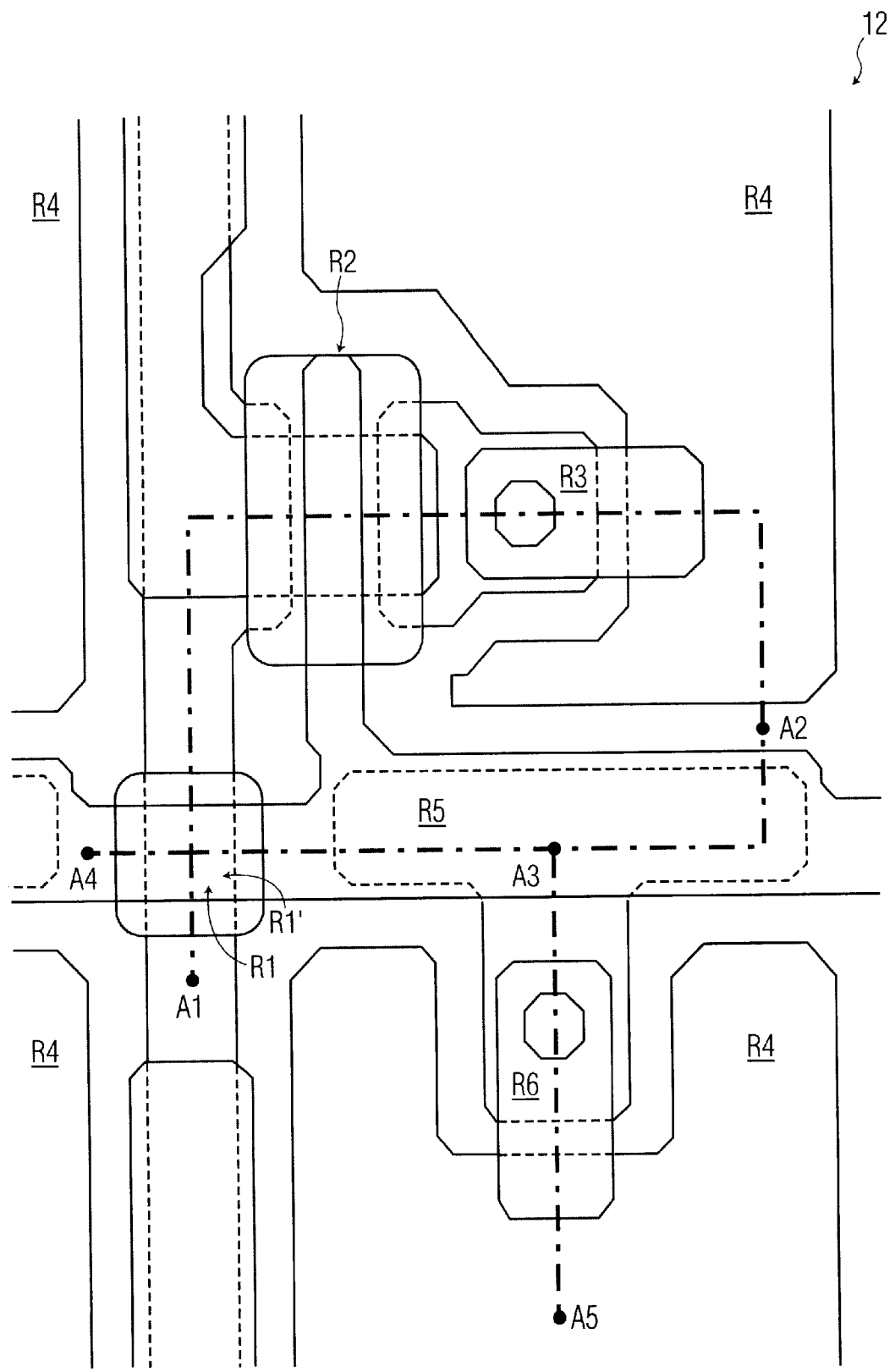
FIG. 5 shows, schematically, a picture element of an AMLCD comprising a self-aligned TFT according to the present invention.

In FIG. 5, there is shown, schematically, a picture element 12 of an AMLCD of the general type shown in FIG. 1 but incorporating the present invention. In addition, FIGS. 6A to 6E illustrates a 5 photomask, single back exposure method of manufacturing the picture element of FIG. 5, further in accordance with the present invention.

Figure 6A:
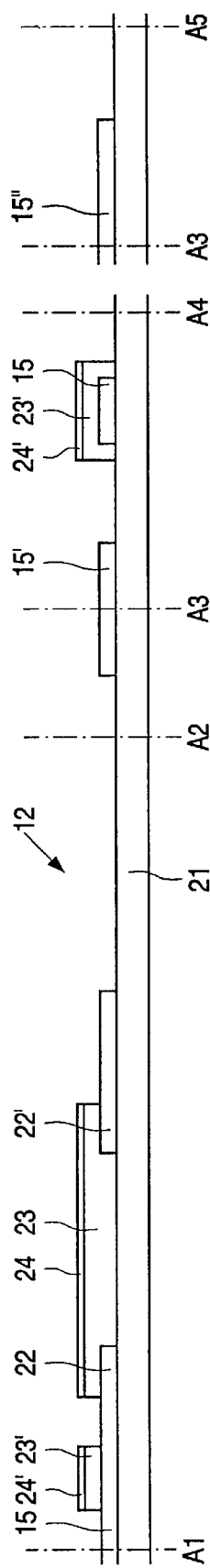
FIGS. 6A to 6E illustrate, schematically, a 5 photomask, single back exposure method of manufacturing the picture element of FIG. 5 according to the present invention.
Figure 6B:
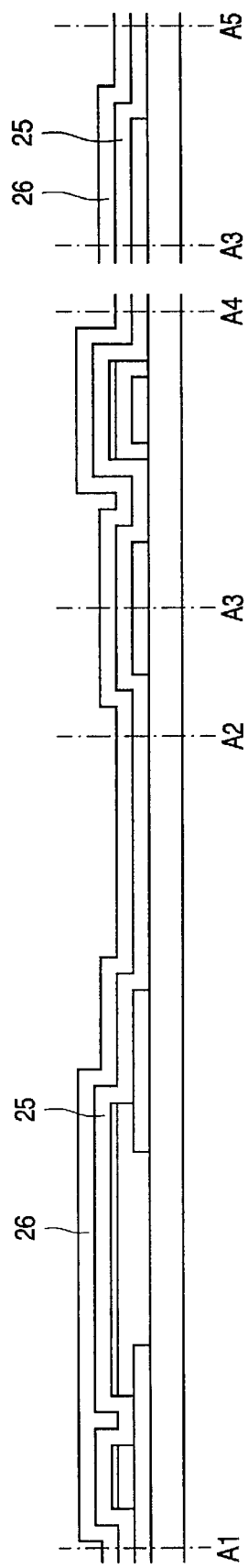
Figure 6C:
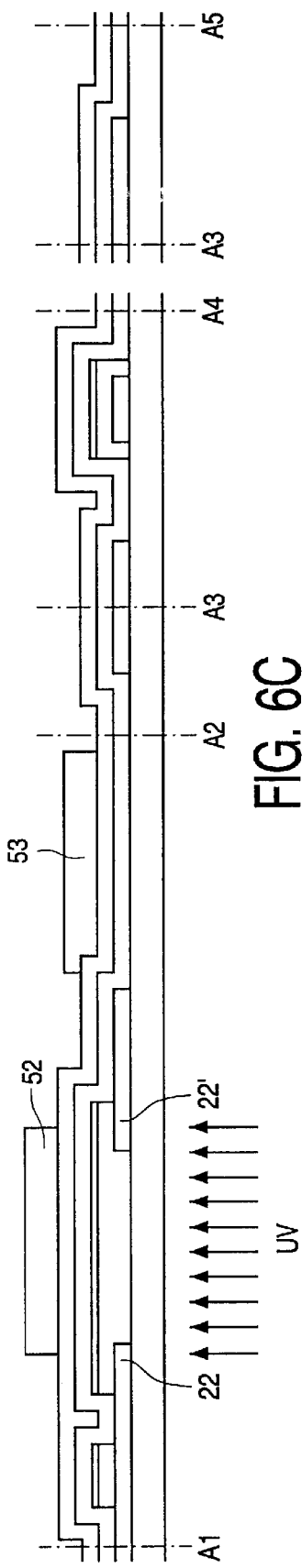
Figure 6D:
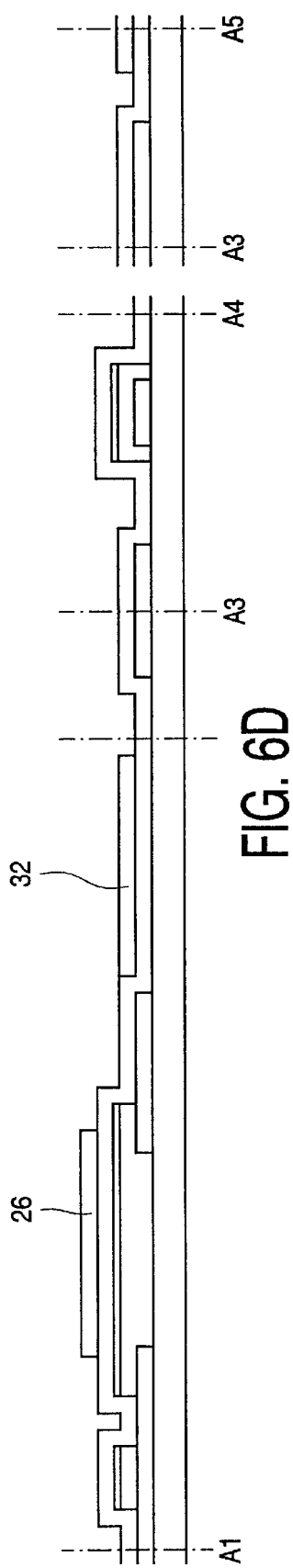
Figure 6E:
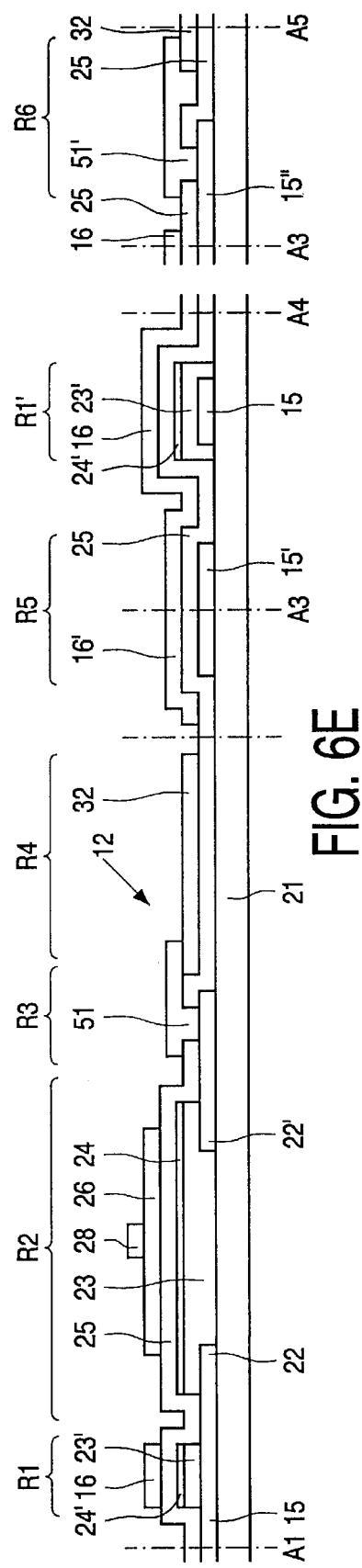

Referring both to FIG. 5 and FIG. 6E which is a cross-section along lines A1-A2-A3-A4 and A3-A5 shown in FIG. 5, the picture element comprises 6 distinct regions: a conductor crossover (R1 and R1' in respective directions); a self-aligned TG TFT (R2); a first contact hole/transparent pixel electrode contact (R3); a transparent pixel electrode (R4); a capacitor (R5); and a second contact hole/transparent pixel electrode contact (R6).

The conductor crossover (R1, R1') comprises a column conductor 15 formed on an insulating substrate 21. A row conductor 16 is laid over the column conductor 15 electrically separated therefrom by an amorphous silicon 23' layer and first and second insulating layers 24', 25.

The TG TFT (R2) is in a staggered arrangement and comprises an amorphous silicon channel 23 joining source 22 and drain 22' electrodes and insulated from a gate electrode 26 by first and second insulating layers 24, 25. The gate electrode 26 consists of ITO and, with some source/drain overlap, is self aligned with respect to the source 22 and drain 22' electrodes. Joining the gate electrode 26 and the row conductor 16 is a gate contact 28, formed as an protrusion from the row conductor.

The pixel electrode 32 (R4) comprises ITO and is formed over the second insulating layer 25. Accordingly, contacts holes and respective contacts (R3, R6) are required, and are etched in the second insulating layer 25 to provide an electrical path between the pixel electrode 32 and the drain electrode 22' (51) and parallel plate capacitor R5 (51') respectively.

The capacitor R5 has a bottom plate 15' formed as part of the column conductor 15, a dielectric layer formed from the second insulating layer 25, and a top plate formed as part of the gate row conductor 16'.

With regard to the method of manufacture, as shown in FIG. 6A, opaque source 22 and drain electrodes 22' are first formed on the glass substrate 21 together with column conductors 15, part of which act a capacitor plate 15' (mask 1). An amorphous silicon semiconductor channel 23 is then formed so as to join the source and drain electrodes and a first insulating layer 24 formed thereon (mask 2). The amorphous silicon 23' and first insulating layer 24' extend from the channel along parts of the column conductor 15.

Referring to FIG. 6B, a second insulating layer 25 is provided over the substantial entirety of the picture element 12 to produce with respect to both the TFT and capacitor, a high integrity dielectric. The insulating layers may be are preferably silicon nitride, but may be silicon dioxide or another dielectric material.

In addition, in order to form the gate electrode 26 and the transparent pixel electrode 32, a layer of ITO is deposited. As shown in FIG. 6C, the transparent gate material is patterned by providing a negative resist layer 52 over the material and selectively exposing it to UV radiation from beneath the substrate 21. The source and drain electrodes 22, 22' shield the UV light, so that the passage of light through the transistor structure only takes place in the spacing between the source and drain electrodes. The UV light diffracts and scatters as it passes through this opening, and results in source/drain overlap wherein the exposed region of the resist layer is wider than the spacing between the source and drain electrodes. Source/drain overlap is useful in that the gate electrode may then modulate the whole of the semiconductor channel area. The transparent pixel electrode is then masked with a conventional etch mask 53 and, as shown in FIG. 6D, the exposed transparent conductive layer etched so as to leave the gate electrode 26 and the pixel electrode 32.

Referring to FIG. 6E, patterning of the second insulating layer 25 includes etching first and second contact holes 51, 51' (mask 3) such that contacts can be deposited so as to connect the pixel electrode 32 to the drain electrode 22' (51) and the column conductor 15/capacitor plate 15' (51') respectively. A metal gate contact 28 connects the transparent gate electrode 26 and row conductors 16.

The individual layers from which the components of the picture element 50 are formed may be deposited by any appropriate technique such as sputtering, chemical vapour deposition, thermal evaporation and so on.

The opaque source and drain electrodes 22, 22' may comprise chromium nitride, molybdenum, aluminium or any other suitable metal or alloy. In addition, they may be formed from a number of sub-layers, however, of course use of multiple sub-layers will complicate the etching process. Patterning by masking using photolithographic techniques with resist layers is of course well known and, similarly, negative photoresists are also known.

In the embodiment described, the semiconductor layer comprises amorphous silicon and as such, it is desirable that additional processing steps are carried out to improve the contact resistance between the metal layers of the source and drain 22, 22' and the silicon layer 23. For this purpose, flash doping of phosphine ions into the structure may be carried out, so that the implanted phosphine ions subsequently migrate into the amorphous silicon layer to form a doped surface region at the point of contact between the amorphous silicon layer and the source and drain contacts. This technique will be known to those skilled in the art.

The semiconductor layer 23 may alternatively comprise microcrystalline silicon, which gives rise to a higher mobility device without introducing significant additional processing complexity. The use of microcrystalline silicon is particularly advantageous in a top gate structure, as the quality of the silicon layer improves as the layer is deposited, so that a higher quality layer is present in the region of the gate of the transistor. As a further alternative, a polycrystalline silicon layer may be formed, for example by depositing an amorphous silicon layer and performing a subsequent laser annealing process.

The active matrix device described above is incorporated into an AMLCD, however, it will be appreciated that the invention has application with respect to active matrix devices for other types of electronic devices such as thin film data stores or image sensors.

In this description, and the claims, the reference to a "transparent" layer indeed indicates the transparency of the layer to the radiation selected for exposure of a negative resist layer. The layers forming the structure of the transistor will, of course, not be 100% transparent, but they will result in some absorption and reflection of the radiation signal. The term "transparent" is therefore intended to indicate only that the layers of the structure are sufficiently transparent to enable the selective exposure of the negative resist layer enable the correct use of the photoresist for subsequent processing of the structure.

Also, reference to a "thin film transistor" and "TFT" means one which at least part of the transistor is manufactured using a thin film technique, i.e. by a method such as chemical or physical vapour deposition, or electrolysis. For the avoidance of doubt, this would also include a transistor made by a hybrid method using both thin film and thick film deposition. For example, from JP-A-60-133758 it is known to manufacture a TFT using hybrid thin and thick film methods and, in particular, to print source, gate and drain electrodes having formed the body of the TFT, the semiconductor and insulating layer, by conventional thin film techniques. Similarly, from JP-A-04-136917, it is known to manufacture an active matrix device comprising a row and column array of such TFTs and furthermore to print the row and column conductors. In addition, from JP-A-60-159825, it is known to provide a TFT with a printed, silica insulating layer.

Figure 3:
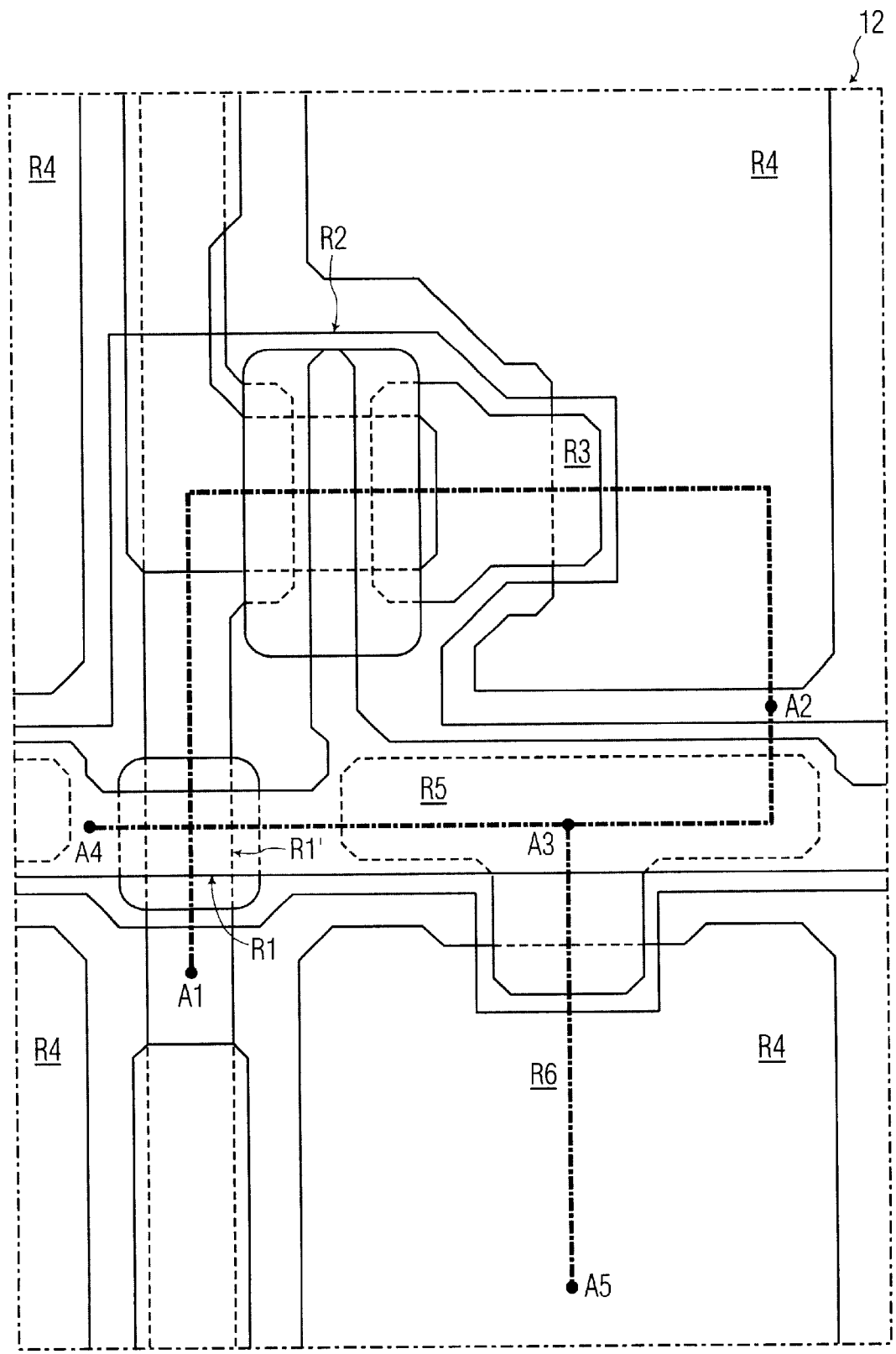
FIG. 3 shows, schematically, a conventional picture element of an AMLCD comprising a self-aligned TFT, as hereinbefore described.

Indeed, there exists particular methods of manufacturing according to the present invention which are ideally suitable to hybrid thin-film manufacture, for example, where the transparent gate electrode 26 and the pixel electrode 32 are formed by self alignment and conventional mask etching respectively from a common layer deposited by printing. In such a case, the gate and pixel electrode may be configured as in the example shown in FIGS. 5 or 6 or, alternatively, the gate electrode 26 may extend to the metal row conductor 16, thereby doing away with the gate contact 28. Similarly, the second insulating layer 25 may be printed and extend over substantially the whole of the active matrix device save for the contact holes as shown in FIGS. 5 and 6. Alternatively, as shown in the conventional arrangement in FIGS. 3 and 4, the second insulating layer may be formed so as to cover only the pixel electrode contacts (R3, R6), the crossover (R1, R1'), the TFT (R2) and the row conductor 16, including integral capacitor (R6) and not the body of the pixel electrode 32.

The specific considerations for the practical manufacture of active matrix devices will be apparent to those skilled in the art, and the considerations which should be applied for existing active matrix and transistor designs should also be applied for design of an active matrix device in accordance with the invention. The precise process conditions which may be appropriate have not been described in this text, as this is a matter of normal design procedure for those skilled in the art.

What is claimed is:

1. A method of manufacturing an active matrix device comprising a row and column array of active elements wherein each element comprises a transparent pixel electrode associated with a self-aligned, top gate transistor having a transparent gate electrode, the method comprising the steps of:

forming opaque source and drain electrodes on a transparent substrate;

forming a semiconductor channel layer so as to join source and drain electrodes;

forming an insulating layer, at least part of which comprises the gate dielectric; and depositing a transparent conductive layer over the insulating layer and forming both the transparent gate electrode and the transparent pixel electrode therefrom.

2. A method according to claim 1 wherein the transparent gate electrode is formed by depositing a layer of negative resist over the transparent conductive layer, exposing the layer of negative resist through the substrate such that regions of the negative resist shadowed by the opaque electrodes remain unexposed, removing the unexposed negative and, having masked the region associated with the transparent pixel electrode, removing the exposed transparent conductive layer.

3. A method according to claim 1 wherein the pixel electrode is formed over the insulating layer.

4. A method according to claim 1 wherein forming the insulating layer includes etching contact holes so as to enable the drain electrode to be connected to the transparent pixel electrode.

* * * * *